(12) United States Patent
Lee et al.

(10) Patent No.: US 10,430,494 B2
(45) Date of Patent: *Oct. 1, 2019

(54) COMPUTER AND METHODS FOR SOLVING MATH FUNCTIONS

(71) Applicant: TEXAS INSTRUMENTS INCORPORATED, Dallas, TX (US)

(72) Inventors: Kyong Ho Lee, Plano, TX (US); Seok-Jun Lee, Allen, TX (US); Manish Goel, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,277

(22) Filed: Feb. 7, 2017

(65) Prior Publication Data

US 2017/0147532 A1 May 25, 2017

Related U.S. Application Data

(63) Continuation of application No. 14/067,343, filed on Oct. 30, 2013, now Pat. No. 9,606,796.

(51) Int. Cl.
*G06F 17/17* (2006.01)
*G06F 9/30* (2018.01)
*G06F 7/544* (2006.01)
*G06F 7/483* (2006.01)

(52) U.S. Cl.
CPC .............. *G06F 17/17* (2013.01); *G06F 7/483* (2013.01); *G06F 7/544* (2013.01); *G06F 9/3001* (2013.01)

(58) Field of Classification Search
None
See application file for complete search history.

(56) References Cited

U.S. PATENT DOCUMENTS

| | | |
|---|---|---|
| 5,235,535 A | 8/1993 | Nakayama |
| 2006/0259745 A1 | 11/2006 | Dhong et al. |
| 2007/0061389 A1 | 3/2007 | Hussain |
| 2008/0228846 A1 | 9/2008 | Hondou et al. |
| 2010/0332573 A1 | 12/2010 | Hondou et al. |
| 2014/0222883 A1 | 8/2014 | Pineiro et al. |

FOREIGN PATENT DOCUMENTS

| | | |
|---|---|---|
| CN | 1741394 A | 3/2006 |
| CN | 1838024 A | 9/2006 |
| CN | 1862483 A | 11/2006 |
| CN | 101154937 A | 4/2008 |
| CN | 103365827 A | 10/2013 |

OTHER PUBLICATIONS

Chinese Search Report from Office Action for CN Application No. 2014105933999 dated Feb. 24, 2018.

*Primary Examiner* — Syed A Roni
(74) *Attorney, Agent, or Firm* — Ebby Abraham; Charles A. Brill; Frank D. Cimino

(57) ABSTRACT

Computers and methods for performing mathematical functions are disclosed. An embodiment of a computer includes an operations level and a driver level. The operations level performs mathematical operations. The driver level includes a first lookup table and a second lookup table, wherein the first lookup table includes first data for calculating at least one mathematical function using a first level of accuracy. The second lookup table includes second data for calculating the at least one mathematical function using a second level of accuracy, wherein the first level of accuracy is greater than the second level of accuracy. A driver executes either the first data or the second data depending on a selected level of accuracy.

20 Claims, 5 Drawing Sheets

| BASELINE FUNCTION | LUT 124 HIGH ACCURACY | LUT 126 LOW ACCURACY |
|---|---|---|
| COS, SIN | $16^{th}$ TAYLOR SERIES | $3^{rd}$ POLYFIT |
| TAN | $23^{rd}$ TAYLOR SERIES | $7^{th}$ POLYFIT |
| ATAN | $3^{rd}$ TAYLOR SERIES IF $|x| < 2^{-5}$ $10^{th}$ POLYFIT OTHERWISE | $3^{rd}$ POLYFIT |
| EXP | $15^{th}$ TAYLOR SERIES | $3^{rd}$ POLYFIT |
| LN | $13^{th}$ TAYLOR SERIES | $4^{th}$ POLYFIT |
| SQRT | NEWTON-RAPHSON, 3 ITERATION | NEWTON-RAPHSON, 2 ITERATION |

| COMPLEX FUNCTION | DERIVED FUNCTION |
|---|---|
| ASIN(x) | $\frac{\pi}{2}$, IF x = 1<br>$\frac{\pi}{2}$, IF x = -1<br>$3^{rd}$ TAYLOR SERIES, IF $|x| < 2^{-2}$<br>ATAN$\left(\frac{x}{\sqrt{1-x^2}}\right)$, OTHERWISE |
| ACOS(x) | $\frac{\pi}{2}$ - ASIN(x) |
| SINH(x) | $3^{rd}$ TAYLOR SERIES, IF $|x| < 2^{-5}$<br>$\frac{e^x - e^{-x}}{2}$, OTHERWISE |
| COSH(x) | $\frac{e^x + e^{-x}}{2}$ |
| TANH(x) | CALCULATE A = $e^x - e^{-x}$ USING $3^{rd}$ TAYLOR SERIES IF $|x| < 2^{-5}$<br>OTHERWISE USE BASELINE FUNCTIONS, CALCULATE $\frac{A}{e^x + e^{-x}}$ |
| CUBED ROOT (x) | EXP$(\frac{1}{3}$LN(x)) |
| ASINH(x) | LN(x + $\sqrt{x^2 + 1}$) |
| ACOSH(x) | LN(x + $\sqrt{x^2 - 1}$) |
| ATANH(x) | $3^{rd}$ TAYLOR SERIES, IF $|x| < 2^{-6}$ IN HIGH ACCURACY MODE<br>$\frac{1}{2}$LN$\left(\frac{1+x}{1-x}\right)$, OTHERWISE |
| $2^x$ | $e^{x LN(2)}$ |
| $LOG_{10}(x)$ | $\frac{LN(x)}{LN(10)}$ |

FIG. 3

COMPUTER AND METHODS FOR SOLVING MATH FUNCTIONS

CROSS-REFERENCE TO RELATED APPLICATION(S)

This continuation application claims priority from U.S. patent application Ser. No. 14/067,343, filed Oct. 30, 2013, now U.S. Pat. No. 9,606,796 issued Mar. 28, 2017, which is hereby incorporated by reference in its entirety.

BACKGROUND

Some computers are used to perform complex math functions, such as cubed root and hyperbolic trigonometric functions. These complex math functions require many cycles to complete, which is time consuming and uses a lot of energy. The long time required to calculate complex functions creates a problem when the computer needs to calculate many complex functions in a short period. For example, if the computer is used to guide an aircraft, the computer may need to calculate pitch, yaw, and roll from a plurality of sensors using complex functions.

The high energy demand required to calculate complex functions becomes an issue with computers that are operating from limited power supplies, such as batteries. The calculation of the complex functions requires many cycles, which draws heavily on the batteries. In addition, the high energy demand creates heat, which may interfere with the operation of the computer.

SUMMARY

Computers and methods for performing mathematical functions are disclosed. An embodiment of a computer includes an operations level and a driver level. The operations level performs mathematical operations. The driver level includes a first lookup table and a second lookup table, wherein the first lookup table includes first data for calculating at least one mathematical function using a first level of accuracy. The second lookup table includes second data for calculating the at least one mathematical function using a second level of accuracy, wherein the first level of accuracy is greater than the second level of accuracy. A driver executes the data from the first lookup table or the second lookup table and sends instructions to the operations level.

BRIEF DESCRIPTION OF THE DRAWINGS

FIG. 3 is a table illustrating examples of complex functions that are calculated by the computer of FIG. 1.

DETAILED DESCRIPTION

Computer architectures, sometimes referred to herein simply as computers, and methods of calculating mathematical functions are described herein. The computers and methods provide for calculating mathematical functions using different options. In the embodiments described herein, a first option calculates complex functions using high accuracy. In this option, many instructions have to be performed to calculate a single complex function, which uses a lot of energy. A second option calculates complex functions using lower accuracy. This second option does not require as many instructions as the high accuracy option, so the complex function can be solved faster, using uses less energy. High accuracy calculations require more instructions and therefore typically require more time to complete than low accuracy calculations. Low accuracy calculations use less energy than high accuracy calculations and may be used in situations where energy preservation is important, such as when the energy comes from a battery-powered source. These situations include situations where a lot of calculations are required on a battery-powered device. The low accuracy option uses less energy than the high accuracy option, so there is less drain on the battery.

In some embodiments, complex functions are broken down into instructions that use simpler functions. For example, the calculation of a hyperbolic sine may be performed by solving exponent functions and division and subtraction operations. In the embodiments described herein, the solutions to the exponent functions are stored in lookup tables. Thus, the computers do not need to calculate the hyperbolic sine function directly. Rather, the computers only need to solve the exponent functions and the subtraction and division operations, which are less time consuming and energy consuming than direct calculations of hyperbolic sine.

Figures 1, 2:
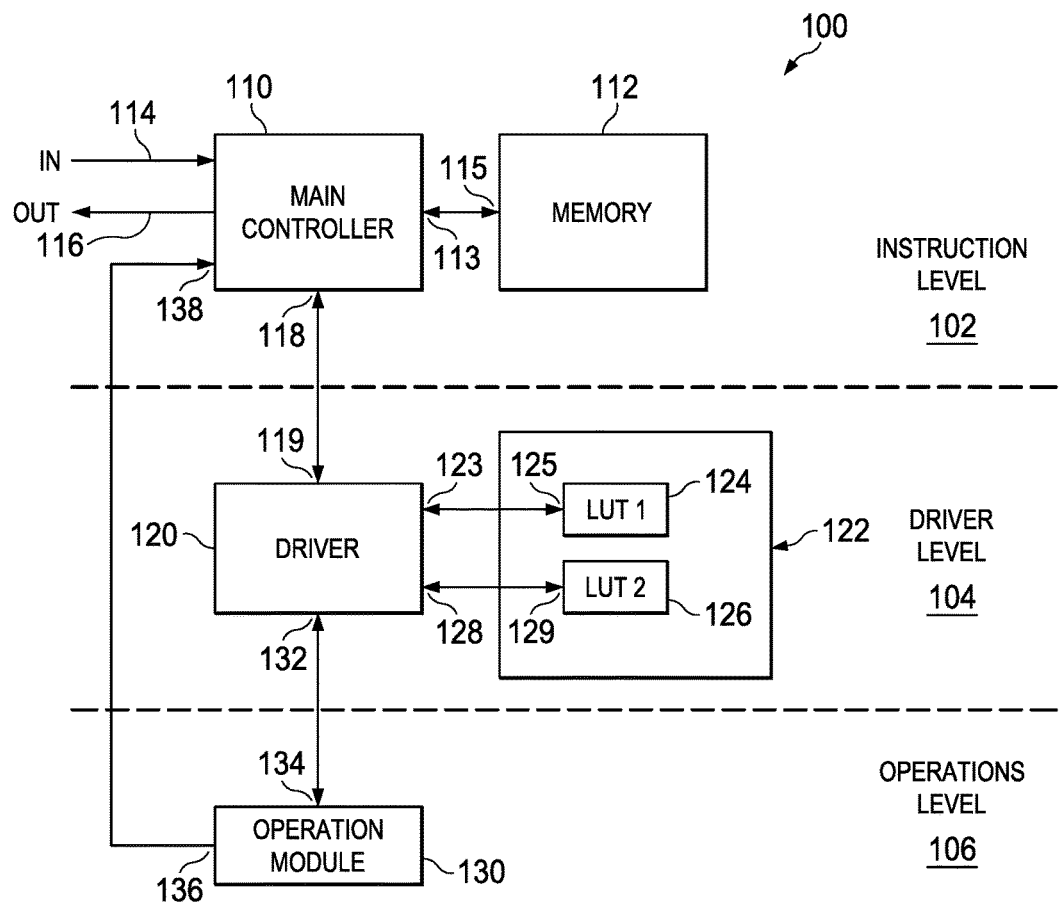
FIG. 1 is a high level block diagram of an embodiment of a computer for solving complex math functions.
FIG. 2 is a table illustrating examples of math functions that are calculated by the driver level of the computer of FIG. 1.

Reference is made to FIG. 1, which is a block diagram of a computer 100. The computer 100 is sometimes referred to as computer architecture. In the embodiment of FIG. 1, the computer 100 includes three levels, an instruction level 102, a driver level 104, and an operations level 106. The instruction level 102 receives instructions to solve or calculate math operations and functions, including complex math functions. In some embodiments, the instruction level 102 also receives a number or value for which the function is to be solved. In addition, the instruction level 102 receives information as to whether the function is to be solved using high accuracy or low accuracy.

Examples of the complex mathematical functions include hyperbolic trigonometric functions, cubed root, and some power functions, such as 2×. The instruction level 102 includes a main controller 110, which is sometimes referred to simply as a controller 110, and memory 112. The controller 110 has an input 114 that receives the above-described functions and numbers. The controller 110 also has an output 116 that outputs the result of the calculation performed by the computer 100. The instruction level 102 may have different embodiments. For example, in some embodiments, the instruction level 102 is or includes an application specific instruction processor (ASIP).

The controller 110 has, or has access to, memory 112 by way of a port 113 on the controller 110 and a port 115 on the memory 112. The memory 112 stores code for solving the complex functions. In some embodiments, the controller 110 calls the memory 112 for instructions to solve a complex function, such as cosh(x). The memory 112 has the instruc tions stored for solving cosh(x), which, in the embodiments described herein is shown by equation (1) as follows:

$$\cosh(x) = \frac{e^x - e^{-x}}{2} \quad \text{Equation (1)}$$

The instruction level 102 communicates with the driver level 104 by way of ports 118 and 119 to solve some functions. In the example of equation (1), the driver level solves the exponent (exp) functions by using lookup tables as described in greater detail below. In some embodiments, the driver level 104 is a state machine. The driver level 104 includes a driver 120 and lookup tables 122. The driver 120 communicates with the controller 110 to receive the instructions from the memory 112 when the computer 100 is solving complex functions, such as equation (1). In some situations, simpler functions are solved that do not require the instructions stored in the memory 112, however, the driver 120 may still receive the instructions for solving these simpler functions from the controller 110.

The driver 120 communicates with the lookup tables 122. There are a plurality of lookup tables 122 that contain information or instructions for different baseline math functions as described below. In the embodiment of FIG. 1, there are two lookup tables, a first lookup table 124, which is sometimes referred to as the LUT 124, and a second lookup table 126, which is sometimes referred to as the LUT 126. In the embodiment of FIG. 1, the LUT 124 stores information or instructions for calculating functions using high accuracy functions and the LUT 126 stores information or instructions for calculating functions using low accuracy, which use less energy. For example, the LUT 126 may return 32 bit data and the LUT 124 may return 38 bit data for higher accuracy calculations. The results from a high accuracy calculation may include one bit for the sign, eight bits for the exponent, and 29 bits for the mantissa. The driver 120 communicates with the LUT 124 by way of ports 123 and 125. The driver 120 communicates with the LUT 126 by way of ports 128 and 129. In some embodiments, the lookup tables 122 contain coefficients for math function approximations and constants for math function implementation. In some embodiments, the lookup tables 124 and 126 contain instructions regarding solving the functions stored in the lookup tables 124 and 126, wherein the lookup table 124 typically requires more instructions to complete the more complex functions that the lookup table 126.

As an example of the different lookup tables, the exponential (exp) function is used to solve the cosh(x) function using a fifteenth order Taylor series in the high accuracy solution and a third order polynomial curve fitting in the low accuracy solution. Polynomial curve fitting is sometimes referred to as polyfit. In the embodiment described herein, the relatively simple baseline functions accessed by the driver 120 and stored in the lookup tables 122 are shown in FIG. 2. The complex functions performed by the computer 100 are shown in FIG. 3 and are performed using the baseline functions, which include sine, cosine, tangent, arctangent, exp, natural log, and square root functions. As shown in FIG. 2, the baseline functions may be solved using either lookup table 124 or 126 depending on the required accuracy and/or energy usage.

The operations level 106 is sometimes referred to as being at the bottom level of the computer 100. In some embodiments, the operations level 106 is a hardware accelerator that performs basic floating-point operations such as addition, subtraction, and multiplication. The operations level 106 includes an operation module 130 that performs the operations. The operation module 130 communicates with the driver 120 by way of ports 132 and 134. The operation module 130 also communicates with the controller 110 by way of ports 136 and 138. In the embodiment of FIG. 1, the operation module 130 is able to output data directly to the controller 110 using ports 136 and 138 without the data being processed by the driver 120.

As stated above, the operations level 106 performs low level operations using the operation module 130. In the embodiments described herein, the operation module 130 performs the following operations:
  floating-point addition and subtraction;
  fixed-point addition and subtraction;
  floating-point multiplication;
  floating-point comparison;
  floating-point to integer casting, which is used to zero-out the fractional part in a floating point number;
  absolute (x) for a floating point number;
  shifting an operand to the right by 1 bit, which is required for inverse square root and reciprocal operations;
  addition of exponents of two floating point numbers, which is required for exp operations;
  masking exponents to 127, which is required for natural log operations;
  converting exponents to floating point numbers, which is required for natural log operations;
  negating computation outputs; and
  rounding results in internal format (29 bit mantissa) and standard format (23 bit mantissa).

Based on the functions that can be performed in the driver level 104 and the operations that can be performed in the operations level 106, the computer 100 is capable of solving a plurality of complex functions. An example embodiment of the complex functions that are performed by the computer 100 is shown by the table in FIG. 3. The table in FIG. 3 also shows the derivations or derived functions that are used to solve the complex functions. The derived functions and their associated operations are performed by the driver 120 in the driver level 104 and the operation module 130 in the operations level 106. In other embodiments, instructions for solving complex functions other than those shown in FIG. 3 are coded into the instruction level 102. In summary, the computer 100 receives an instruction to solve a complex function as shown in FIG. 3. The computer uses the derived functions of FIG. 3 to solve the complex function. The derived functions of FIG. 3 have baseline functions and operations that are solved using the lookup tables shown in FIG. 2 and the operations in the operations level 106.

Figure 4:
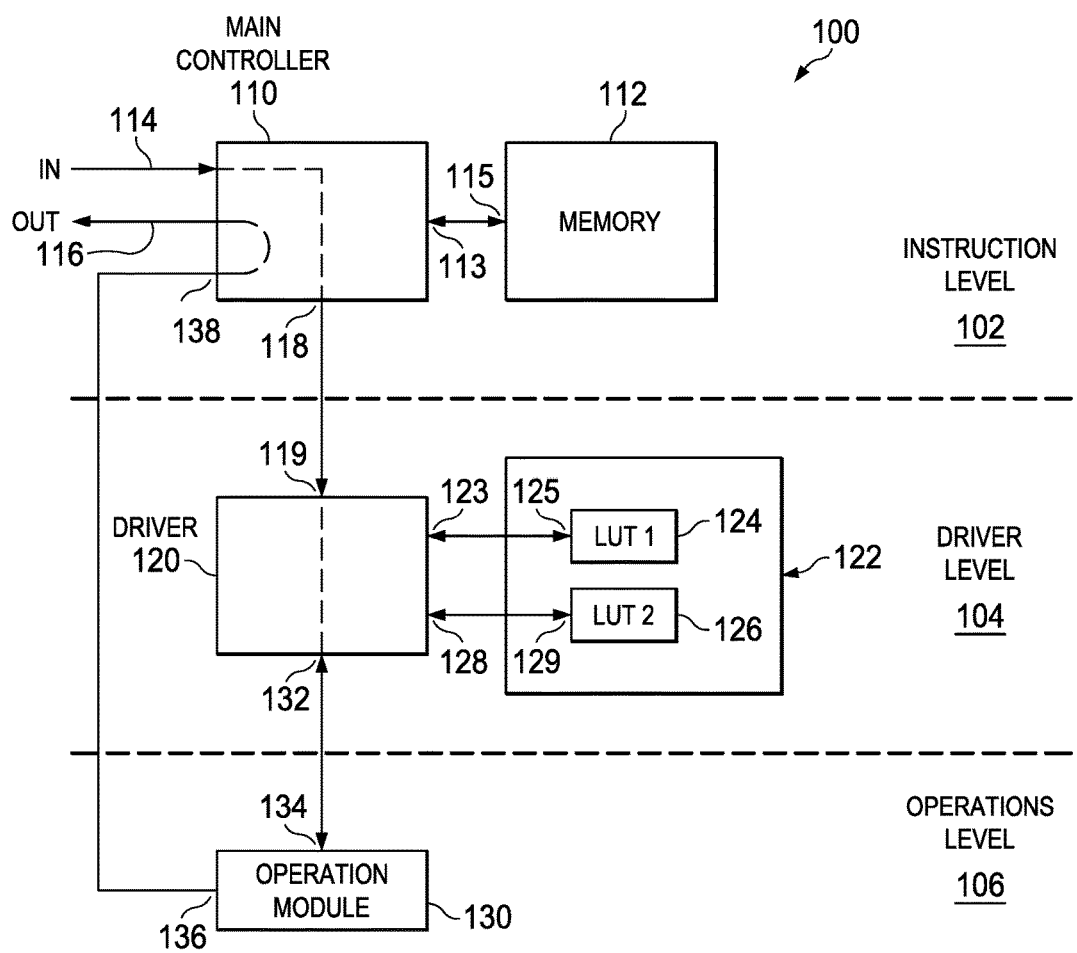
FIG. 4 is a flow diagram of the computer of FIG. 1 when it is calculating equations using basic operations.

Having described the components of the computer 100, its operation will now be described using several different examples. Reference is made to FIG. 4, which shows the flow through the computer 100 when the data and instructions at the input 114 indicate that a math operation using the operations in the operating level 106 is to be calculated. The data and/or instructions received at the input 114 are analyzed by the main controller 110. In this embodiment, the data is two numbers and an instruction is to add these two numbers. The controller 110 sends instructions to the operation module 130 to perform the addition operation. As shown in FIG. 4, the instructions and/or data passes through the driver 120. In some embodiments, the data and/or instructions bypass the driver 120. In other embodiments, the driver 120 analyzes the instructions and/or data from the controller 110 and passes the instructions and/or data to the operation module 130. In some embodiments, the driver 120 puts the instructions and data in a format that the operation module 130 is able to readily execute.

The operation module 130 executes the instruction by performing the operation. In this embodiment, two numbers are added together. As shown in FIG. 4, the result is transferred directly to the controller 110, which sends the result to the output 116. In some embodiments, the controller 110 sends instructions to the operation module 130 that directs the result calculated by the operation module 130 be sent directly to the controller 110 so as to bypass the driver 120. Bypassing the driver 120 enables the computer 100 to perform the operation faster than embodiments where the result is passed to the driver 120.

Figure 5:
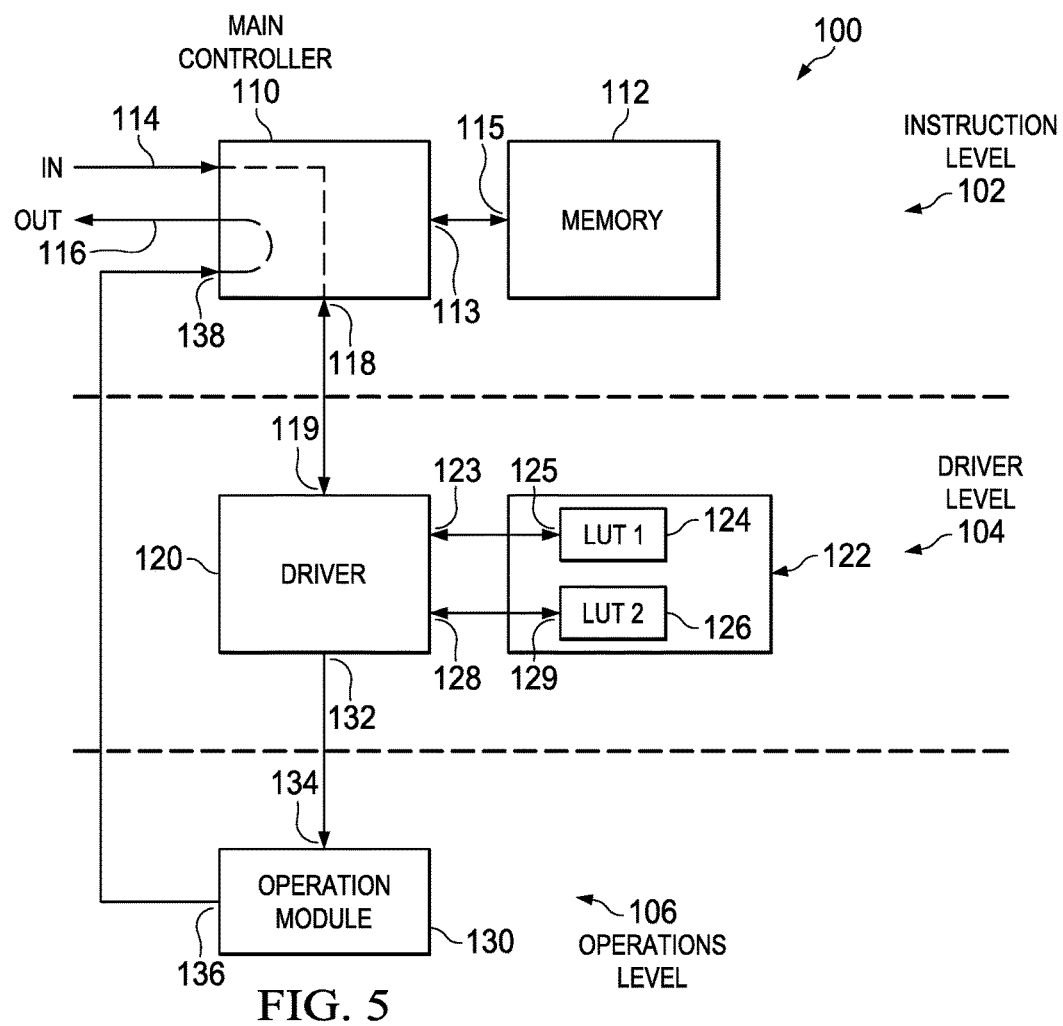
FIG. 5 is a flow diagram of the computer of FIG. 1 when it is calculating the function sin(x).

A second embodiment of the operation of the computer 100 is shown in FIG. 5 where the computer 100 is determining sin(x). The computer 100 receives instructions and data, wherein the instructions are to perform a sine function and the data is the value of (x). The instructions can include data as to whether the sine function is to be performed using high accuracy or low accuracy. As described above, low energy calculations are the same as low accuracy calculations. Referring to the table of FIG. 2, the high accuracy sine function is calculated using a sixteenth order Taylor series and the low accuracy sine function is calculated using a third order polyfit.

The controller 110 analyzes the instructions and determines that the function is performed at the driver level 104. Instructions are then sent to the driver 120 to perform the sine function. The instructions also indicate whether high accuracy or low accuracy is to be used. The driver 120 analyses the instructions and accesses the proper lookup table. If high accuracy is required, the LUT 124 is addressed and the sin(x) function is calculated using a sixteenth order Taylor series. If low accuracy or low energy is required, the LUT 126 is addressed and the sin(x) function is solved using the third order polyfit. In using either the Taylor series or the polyfit, the driver 120 needs to access operations, such as addition, in the operation module 130. In some embodiments, the driver 120 transmits values to the operation module 130 to be added with instructions that the sum is to be transmitted to the controller 110. The driver 120 also sends a signal to the controller 110 indicating that the result of the sin(x) function will be output by the operation module 130. When the result is received from the operation module 130, it is output by way of the output 116 of the controller 110.

In a third example, which is related to FIG. 4, the computer 100 receives instructions to solve a complex function, such as the hyperbolic cosine of x, or cosh(x). As with the previous example, the instructions may include whether the cosh(x) function is to be calculated using high or low accuracy. The controller 110 reads the instructions and determines that the function is a complex function and needs to be solved using the code stored in the memory 112. The code includes instructions for solving the function using the derived function of cosh(x) as shown in FIG. 3. The controller 110 executes the code related to solving for cosh(x), which is shown in equation (1). The instructions require the driver 120 to execute the functions of $e^x$ and $e^{-x}$. The driver 120 uses the operation module 130 to perform the addition and division required from equation (1). When the operation module 130 has performed the final operation, the result is sent to the controller 110 where it is output to the output 116.

Figure 6:
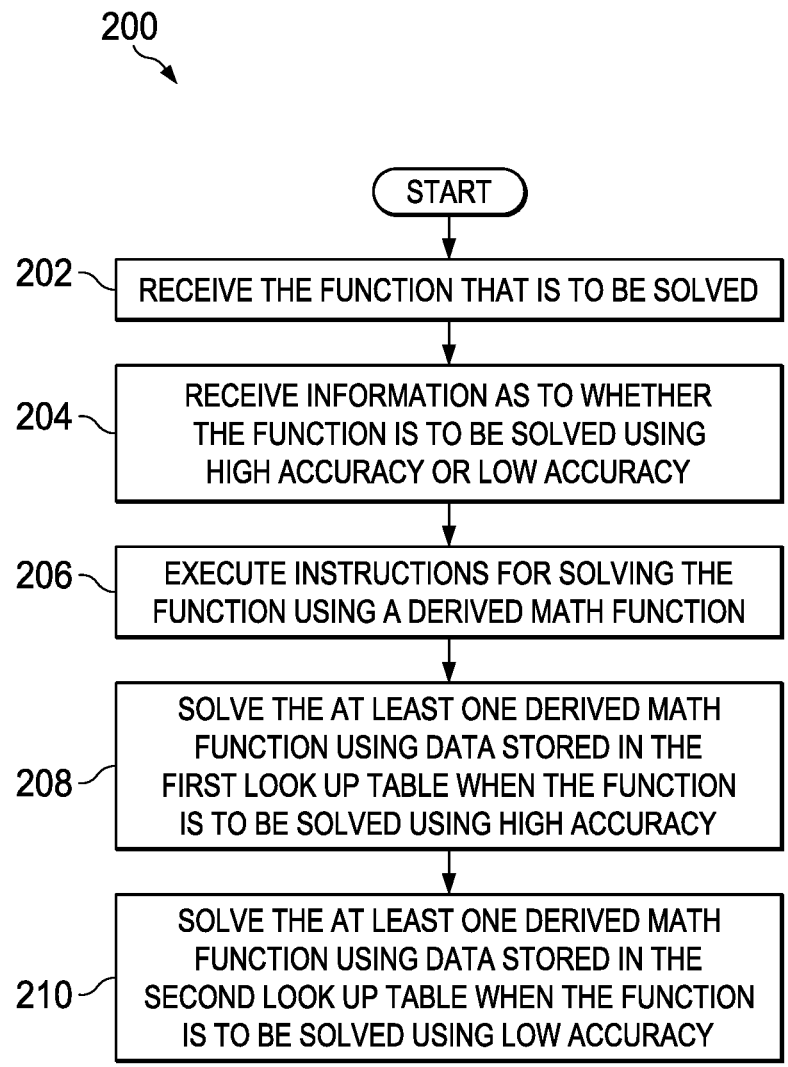
FIG. 6 is a flowchart showing the operation of the computer of FIG. 1.

The operation of the computer 100 solving a function is shown by the flowchart 200 of FIG. 6. In block 202, the function to be solved is received. In block 204, information is received as to whether the function is to be solved using high accuracy or low accuracy. In some embodiments, the information in blocks 202 and 204 is received in one step. In step 206 instructions for solving the function using at least one derived math function are executed. For example, a derived math function as shown in FIG. 3 is used to solve a complex function. In step 208, the at least one derived math function is solved using data stored in a first lookup table in response to the function being solved using high accuracy. In step 210, the at least one derived math function is solved using data stored in a second lookup table in response to the function being solved using low accuracy. The lookup tables may include instructions for solving the baseline functions stored in the lookup tables as described above.

The computer 100 provides for high accuracy and low accuracy solutions to complex math functions. In some embodiments, such as vehicle sensors, high accuracy calculations may be required. The LUT 124 stores the information necessary for the high accuracy calculations. Other embodiments do not need the high accuracy and may need to conserve energy. For example, some battery operated devices may operate using the low accuracy information in the LUT 126, which conserves energy.

While illustrative and presently preferred embodiments of harvesting devices have been described in detail herein, it is to be understood that the inventive concepts may be otherwise variously embodied and employed and that the appended claims are intended to be construed to include such variations except insofar as limited by the prior art.

What is claimed is:

1. A computer comprising:
   a hardware accelerator that performs mathematical operations; and
   a driver level comprising:
      a first lookup table, wherein the first lookup table includes first data for calculating a mathematical function using a first level of accuracy; and
      a second lookup table, wherein the second lookup table includes second data for calculating the mathematical function using a second level of accuracy, wherein the first level of accuracy achieves a more accurate solution than the second level of accuracy; and
   a driver that executes the data from the first lookup table and the second lookup table, and wherein the driver sends instructions to the hardware accelerator, wherein executing data in the first lookup table for solving the mathematical function using a first level of accuracy uses more energy than executing data in the second lookup table for solving the mathematical function using a second level of accuracy.

2. The computer of claim 1, wherein the first data and the second data include instructions for calculating the mathematical function and wherein the second data includes fewer instructions than the first data.

3. The computer of claim 1, wherein the first data includes instructions related to a first number of cycles to calculate the mathematical function, wherein the second data includes instructions related to a second number of cycles to calculate the mathematical function, and wherein the first number of cycles is greater than the second number of cycles.

4. The computer of claim 1, wherein the mathematical operations performed in the operations level are floating point operations.

5. The computer of claim 1, wherein the first data and the second data contain an one instruction to perform an operation in the operations level.

6. The computer of claim 1 and further comprising an instruction level, the instruction level comprising:
- a memory that includes instructions for solving a complex function using the data stored in the first lookup table and the second lookup table; and
- a controller that executes the instructions stored in the memory and sends instructions to the driver.

7. The computer of claim 6, wherein the controller receives instructions that include a complex function to be solved by the computer.

8. The computer of claim 6, wherein the instructions received by the controller further indicate whether high accuracy or low accuracy is to be used in solving the complex function.

9. The computer of claim 8, wherein the controller instructs the driver to access the first lookup table when the complex function is to be solved using high accuracy and wherein the controller instructs the driver to access the second lookup table when the complex function is to be solved using low accuracy.

10. The computer of claim 8, wherein the hardware accelerator is an application specific instruction processor.

11. The computer of claim 6, wherein the instructions received by the controller further indicate whether high accuracy or low energy is to be used in solving the complex function.

12. The computer of claim 11, wherein the controller instructs the driver to access the first lookup table when the complex function is to be solved using high accuracy and wherein the controller instructs the driver to access the second lookup table when the complex function is to be solved using low energy.

13. The computer of claim 6, wherein the controller sends instructions to the driver related to solving the complex function, wherein the driver access one of either the first lookup table or the second lookup table, and wherein the driver further accesses the operation level to perform operations per data in either the first lookup table or the second lookup table.

14. The computer of claim 13, wherein results calculated by the operations level are output directly to the controller.

15. The computer of claim 1, wherein the driver level is a state machine.

16. A method comprising:
- receiving, at a driver, a first instruction for solving a mathematical function, the first instruction specifying whether to solve the mathematical function using a first level of accuracy or a second level of accuracy, wherein the first level of accuracy achieves a more accurate solution than the second level of accuracy;
- executing, at the driver, a second instruction using data stored in a first lookup table when the first instruction specifies solving the mathematical function using a first level of accuracy;
- executing, at the driver, the second instruction using data stored in a second lookup table when the first instruction specifies solving the mathematical function using a second level of accuracy, wherein executing a second instruction using data stored in a first lookup table uses more energy than executing the second instruction using data stored in a second lookup table; and
- transmitting, by the driver, a third instruction to a hardware accelerator to perform a mathematical operation.

17. The method of claim 16, wherein the third instruction to perform a mathematical operation comprises the third instruction to perform a floating point operation.

18. The method of claim 16, wherein first instruction further indicates whether high accuracy or low energy is to be used in solving the mathematical function.

19. The method of claim 16, wherein results calculated by the hardware accelerator are output directly to a controller.

20. The method of claim 16, wherein the hardware accelerator is an application specific instruction processor.

\* \* \* \* \*